United States Patent
Davraev et al.

(10) Patent No.: US 12,430,427 B2
(45) Date of Patent: Sep. 30, 2025

(54) METHODS, SYSTEMS AND COMPUTER PROGRAMS FOR DETECTING POTENTIALLY SUSPICIOUS RESOURCE ACCESS EVENTS

(71) Applicant: Microsoft Technology Licensing, LLC, Redmond, WA (US)

(72) Inventors: Daniel Davraev, Or Yehuda (IL); Shalom Shay Shavit, Yehud (IL); Ram Haim Pliskin, Rishon Le Tzion (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 291 days.

(21) Appl. No.: 18/068,440

(22) Filed: Dec. 19, 2022

(65) Prior Publication Data

US 2024/0070271 A1 Feb. 29, 2024

Related U.S. Application Data

(60) Provisional application No. 63/374,135, filed on Aug. 31, 2022.

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .................. G06F 21/554; G06F 2221/034
See application file for complete search history.

(56) References Cited

U.S. PATENT DOCUMENTS

| | | | | |
|---|---|---|---|---|
| 10,489,066 | B1 * | 11/2019 | Krinke | G06F 3/0619 |
| 2008/0256635 | A1 * | 10/2008 | Gassoway | G06F 21/562 |
| | | | | 726/24 |
| 2009/0083287 | A1 * | 3/2009 | Bell | G06F 16/838 |
| 2011/0113076 | A1 | 5/2011 | Jo et al. | |
| 2016/0055064 | A1 * | 2/2016 | Gostev | G06F 16/27 |
| | | | | 726/4 |

(Continued)

FOREIGN PATENT DOCUMENTS

| | | |
|---|---|---|
| CN | 102750198 B | 1/2016 |
| CN | 106407411 A | 2/2017 |

(Continued)

OTHER PUBLICATIONS

Michael, Hauss, "Soft Delete for Azure Storage Blobs now in public preview", Retrieved from: https://azure.microsoft.com/en-us/blog/soft-delete-for-azure-storage-blobs-now-in-public-preview/, Mar. 27, 2018, 6 Pages.

(Continued)

*Primary Examiner* — Carl G Colin
*Assistant Examiner* — Zhe Liu
(74) *Attorney, Agent, or Firm* — Barta Jones, PLLC

(57) ABSTRACT

A recovery instruction pertaining to a resource is detected. The recovery instruction is matched with a delete instruction that caused the resource to enter a soft-deleted. A mismatch between a first user account associated with the recovery instruction and a second user account associated with the delete instruction is determined. A mitigation action is performed based on determining the mismatch between the first user account and the second user account.

20 Claims, 4 Drawing Sheets

(56) References Cited

U.S. PATENT DOCUMENTS

| | | | |
|---|---|---|---|
| 2016/0275277 A1* | 9/2016 | Huang | G06F 21/60 |
| 2020/0065484 A1* | 2/2020 | Gordon | G06F 21/604 |
| 2020/0183607 A1 | 6/2020 | Prasad et al. | |
| 2020/0322800 A1* | 10/2020 | Ozanian | H04W 12/03 |
| 2020/0409802 A1* | 12/2020 | Lim | G06F 11/1451 |
| 2021/0026973 A1 | 1/2021 | De Freitas Cunha et al. | |
| 2022/0129183 A1* | 4/2022 | Chitloor | G06F 3/0653 |
| 2022/0245268 A1 | 8/2022 | Dhawan et al. | |

FOREIGN PATENT DOCUMENTS

| | | |
|---|---|---|
| CN | 11144077 A | 5/2020 |
| CN | 113342579 A | 9/2021 |

OTHER PUBLICATIONS

"International Search Report and Written Opinion issued in PCT Application No. PCT/US23/028906", Mailed Date: Oct. 25, 2023, 12 Pages.

"Digital Forensics, Part 3: Recovering Deleted Files", Retrieved from: https://www.hackers-arise.com/post/2016/10/10/digital-forensics-part-3-recovering-deleted-files, Oct. 10, 2016, 10 Pages.

"How to detect user executed Undo command", Retrieved from: http://www.verycomputer.com/204_bc24384d5672015e_1.htm, Retrieved Date: Aug. 10, 2022, 2 Pages.

"How to detect who deleted a file", Retrieved from: https://web.archive.org/web/20210825173938/https://www.manageengine.com/data-security/how-to/how-to-detect-who-deleted-a-file.html, Aug. 25, 2021, 3 Pages.

Adamson, "New Function for IBM Hardware Clients", Retrieved from: https://www.ibm.com/mysupport/s/question/0D50z00006HIF9BCAX/detect-an-undorollback-during-pre-save-trigger?language=en_US, Dec. 14, 2015, 3 Pages.

Garg, Rashi, "Recovering Deleted Digital Evidence", Retrieved from: https://www.geeksforgeeks.org/recovering-deleted-digital-evidence/, Aug. 26, 2022, 9 Pages.

Malygin, et al., "Undo changes in another user's workspace", Retrieved from: https://learn.microsoft.com/en-us/azure/devops/repos/tfvc/undo-changes-another-user-workspace?view=azure-devops, Oct. 5, 2022, 2 Pages.

Moore, et al., "Azure Resource Optimization (ARO) Toolkit", Retrieved From: https://learn.microsoft.com/en-us/samples/azure/azure-quickstart-templates/azure-resource-optimization-toolkit/, Jul. 6, 2022, 15 Pages.

Redmond, Tony, "How to Search the Microsoft 365 Audit Log for SharePoint and OneDrive Deletion Events", Retrieved from: https://office365itpros.com/2021/12/16/sharepoint-online-deletion/, Dec. 16, 2021, 3 Pages.

Shen, Leon, "Microsoft Dynamics AX Forum", Retrieved from: https://community.dynamics.com/ax/f/microsoft-dynamics-ax-forum/393471/tfs-how-to-undo-checkout-by-another-user, Jun. 23, 2020, 5 Pages.

Walker, Kevin, "How to Recover Deleted Files from Network Drive Shared Folder", Retrieved from: https://www.imyfone.com/data-recovery/recover-deleted-files-from-network-drive-shared-folder/, Aug. 4, 2022, 5 Pages.

Zakhareyev, Eugene, "Undo Check Out of another user", Retrieved from: https://social.msdn.microsoft.com/Forums/lync/en-US/756c2ab0-804f-41dc-8fb1-719b6e23f949/undo-check-out-of-another-user?forum=tfsversioncontrol, Retrieved Date: Aug. 10, 2022, 4 Pages.

\* cited by examiner

METHODS, SYSTEMS AND COMPUTER PROGRAMS FOR DETECTING POTENTIALLY SUSPICIOUS RESOURCE ACCESS EVENTS

CROSS-REFERENCE TO RELATED APPLICATION

This application claims the benefit of U.S. provisional application No. 63/374,135 filed on Aug. 31, 2022, entitled "Methods, Systems and Computer Programs for Detecting Potentially Suspicious Resource Access Events" the entirety of which is hereby incorporated by reference herein.

TECHNICAL FIELD

The present disclosure pertains to methods, systems and computer programs for detecting potentially suspicious resource access events.

BACKGROUND

Cybersecurity technology may be used to detect and mitigate (e.g., report and/or remediate) potentially suspicious behavior within or otherwise pertaining to computer infrastructure, such as a computer device or a system of networked computer devices. For example, in a cloud-computing context, a cybersecurity detector may be deployed to detect a behaviour pattern indicative of malicious or otherwise potentially suspicious activity within cloud computing infrastructure (such as a potentially suspicious attempt to access a certain resource).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

In one example aspect, a recovery instruction pertaining to a resource is detected. The recovery instruction is matched with a delete instruction that caused the resource to enter a soft-deleted. A mismatch between a first user account associated with the recovery instruction and a second user account associated with the delete instruction is determined. A mitigation action is performed based on determining the mismatch between the first user account and the second user account.

BRIEF DESCRIPTION OF FIGURES

Illustrative embodiments will now be described, by way of example only, with reference to the following schematic figures, in which.

DETAILED DESCRIPTION

Figure 1:
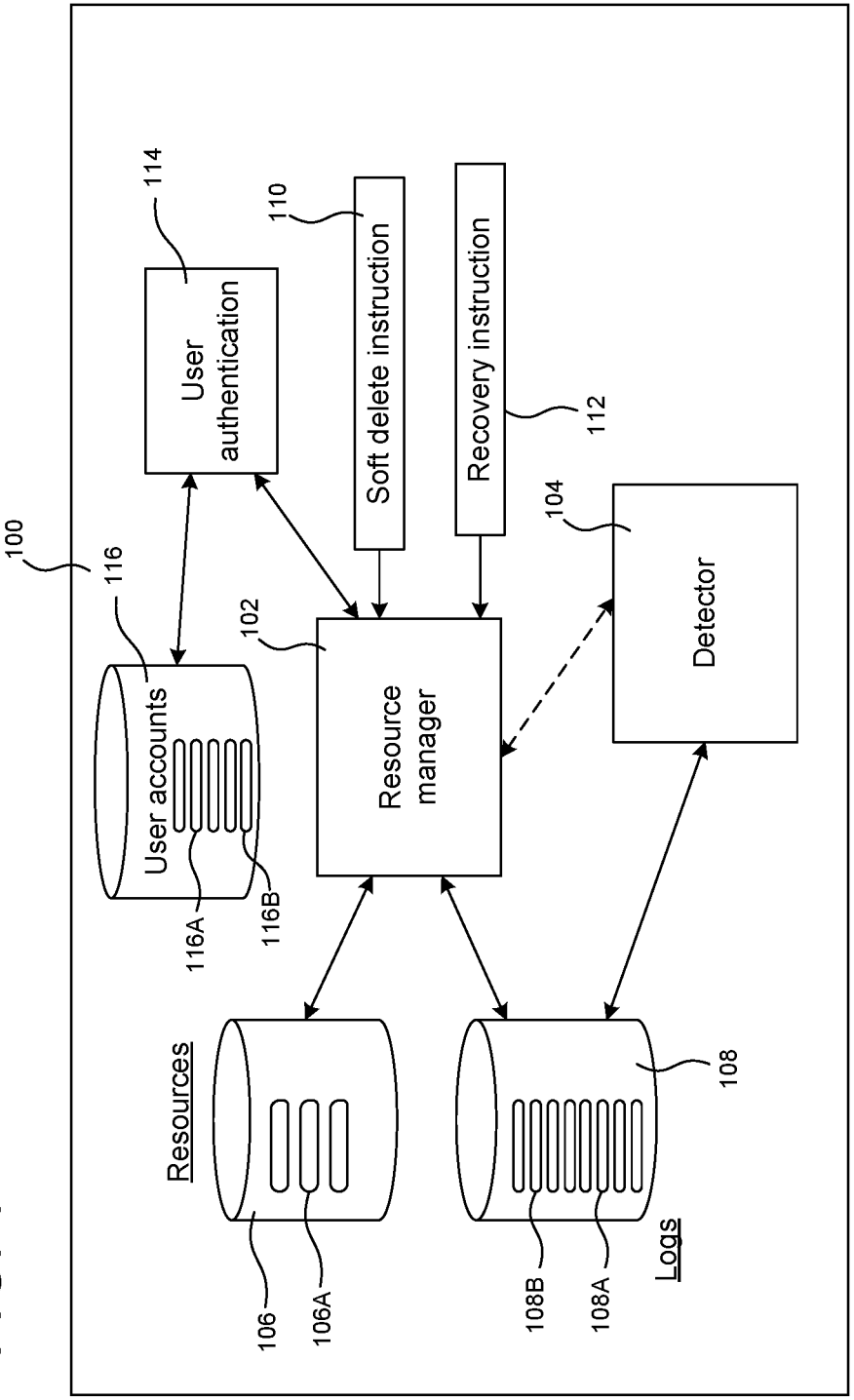
FIG. 1 shows a schematic block diagram of an example computer system.

In one example, a recovery instruction pertaining to a resource is detected. The recovery instruction is matched with a delete instruction that caused the resource to enter a soft-deleted state (e.g., that caused the resource to be marked for deletion and/or to be moved to a special physical or logical computer storage region reserved for deleted items). A mismatch between a first user account associated with the recovery instruction and a second user account associated with the delete instruction is determined (suggesting that a first user who recovered or attempted to recover the resource is different than a second user who originally caused the resource to enter the soft-deleted state). A mitigation action is performed based on determining the mismatch between the first user account and the second user account. In one example, the recovery instruction is detected after it has already been carried out (e.g., after the resource has been successfully recovered), such that the resource is no longer marked for deletion at that point (e.g., the recovery instruction may be detected from a resource recovery log recording the recovery instruction). In such cases, the mitigation action could, for example, comprise generating a security alert and/or reversing the recovery instruction (e.g., permanently deleting the resource, or causing it to re-enter the soft-deleted state). In another example, the recovery instruction is detected before carrying out the recovery instruction. In such cases, the mitigation action may, for example, comprise generating a security alert and/or rejecting the recovery instruction (e.g., so that it is never carried out, and the resource remains in the soft-deleted state). For example, the aforementioned operations may be performed in order to determine whether to accept or reject the recovery instruction.

There are many computing contexts in which a resource (such as a file, document, database, data record, data field or other data item, etc.) may enter a 'soft delete' state responsive to a delete instruction. For example, a resource held in a physical or logical storage location may be marked for deletion but remain in that storage location until an associated recovery interval has expired, with the resource only being deleted from that storage location after the recovery interval has expired. During the recovery interval, the resource can be recovered by 'unmarking' the resource (so that the resource is no longer marked for deletion, and the recovery interval is terminated so that the resource is not deleted from that storage location). A resource may be marked, e.g., by setting an associated deletion flag or other deletion field. As another example, a resource may be marked for deletion without an expiring recovery interval and may, for example, only be deleted responsive to a further delete instruction (e.g. a user confirming final deletion). As another example, a resource may be soft-deleted by moving it to a different physical or logical storage location that is reserved for soft-deleted items (such as a 'recycling bin'). Similarly, the resource may be deleted from that location upon expiration of recovery interval and/or responsive to a further delete instruction.

The described embodiments consider an example computing context, in which multiple users have some level of access to a given resource. In particular, a context is considered in which a second user is authorized to soft-delete a resource and a first user is able to see that the resource has been soft-deleted and at least attempt to recover it.

A resource may, for example, be stored in a backend system, to which multiple users (such as developers, engineers, IT support personnel etc.) have some level of access, e.g. for the purpose of development, maintenance, analysis etc. For a complex backend system, e.g. delivering applications/services to large numbers of end-users, a relatively large number of backend users or have some degree of access to backend resources (a distinction is drawn between a backend user within some level of access to backend resources, and an end-user who merely consumes a service or uses an application delivered by the backend system, but does not have such backend access). Granting such access to multiple backend users may be beneficial in terms of maintaining and developing applications, services etc. However, this situation presents a potential security risk, in the event that any one of the backend user accounts is compromised by a malicious actor (attacker). Similar considerations apply more generally to any backend system, including smaller and/or less complex systems.

The ability to soft delete resources allows such resources to be recovered in the event of a mistake, or if a resource were deliberately deleted by an attacker attempting impact the backend environment. Hence, there are not only practical benefits but also security benefits attached to soft delete functionality.

On the other hand, soft delete functionality potentially exposes a system to a different form of cybersecurity risk, whereby an attacker illegitimately recovers (or attempts to recover) a resource in a soft-deleted state (referred to as a 'recovery attack' herein). For example, resources such as files, databases or other storage objects, cryptographic keys, shared secrets, backups and the like may contain sensitive information vulnerable to exploitation by an attacker. The level of risk generally increases as the number of users with resource access rights increases.

In the following examples, a detection function and method are described, to enable detection of suspicious recovery events, e.g. to support a reporting and/or remediation action in response.

Whilst a backend (e.g. cloud) computing context is considered, the techniques are not limited in this respect. For example, another relevant context is a computing device, accessible based on multiple user accounts (local or remote). A user can authenticate against any such user account for which they possess the necessary credential(s) (e.g. username and password). In such cases, a resource may, for example, be local to the computing device.

A recovery event is flagged as potentially suspicious if it appears that a user recovering (or attempting to recover) a resource in a soft-deleted state is different that a user who caused the resource to enter the soft-deleted state. An improvement in computer security is provided by way of an appropriate mitigation action (e.g. generating an alert, blocking a recovery attempt or reversing a recovery) performed in response to detecting a suspicious recovery event.

An attacker wishing to carry out a recovery attack on a given resource is hindered from doing so. It is not sufficient for the attacker to compromise any user account with resource recovery rights. Rather, the attacker needs to know and target the specific user account that caused the resource to be soft deleted.

Note that a user need not be human. For example, a user could be a malicious software agent (e.g. 'bot') that has compromised a user account. A user could also be a non-malicious software agent in an automated or semi-automated system.

In one example, a recovery instruction is generated via a resource management interface (such as a graphical user interface or online portal accessible to certain users). In the following examples, the resource management interface enables an authenticated user to view a resource in a soft-deleted state, but does identify the user that performed the soft delete. Hence, an attacker with access to the resource management interface (based on a compromised user account) will not gain any knowledge that would assist them in circumventing the resource recovery safeguards described herein.

Note that a user need not be human. For example, a user could be a malicious software agent (e.g. 'bot') that has compromised a user account. A user could also be a non-malicious software agent in an automated or semi-automated system.

FIG. 1 shows a schematic block diagram of an example computer system 100, which in turn is shown to comprise a resource manager 102, a detector 104 and a user authentication component 114. The resource manager 102 is responsible for managing resources 106 within the computer system 100. Among other things, the resource manager 102 has the capability to place resources in a soft-deleted state, recover soft-deleted resources, and permanently delete resources that have been soft deleted (e.g. once an associated recovery interval has expired).

A log database 108 is shown, in which the resource manager 102 records resource access events, such as soft delete instructions, recovery instructions etc. An access event is recorded in a resource access log (e.g. resource delete log, resource recovery log etc.) that contains a resource identifier that identifies a resource (or resources) to which the access event pertains. In the case of an access instruction that is associated with a user account, the resource access log contains a user identifier that identifies the associated user account. For example, an access instruction may be instigated by a user who has successfully authenticated against a user account that has appropriate access rights, and the resource log may record that user account as a source of the access instruction (meaning the access instruction has been generated based on that user account, typically by a user based on a successful authentication against that user account). The fact that the user has successfully authenticated in this manner does not necessarily imply that user is authorized to perform this action, because the user could be attacker who has gained access to a compromised user account.

A user account database 116 is shown, in which user accounts details are stored. The user authentication component 114 has access to the user account database 116, and the user account database 116 holds user account records. The user account records contain sufficient information to enable the user authentication component 114 to carry out user authentication. The user account database 116 records a first user account 116A and a second user account 116B. The resource manager 114 communicates with the user authentication component 114 (directly or indirectly) in determining whether to accept or reject an access instruction. For example, on receiving an access instruction associated with a user account, the resource manage 102 may verify (i) whether the instruction has been provided by an authenticated user and (ii) whether the user account in question (the user account against which the user has successfully authenticated) has sufficient access rights.

FIG. 1 shows the resource manager 102 receiving a soft delete instruction 110 and a recovery instruction 112. Typically, the resource manager 102 receives the recovery instruction 112 at a time after the soft delete instruction 110. In this example, the first user account 116A is a source of the recovery instruction 112, and the second user account 116B is a source of the soft delete instruction 110. The soft delete instruction 110 pertains to a resource 106A and the recovery instruction 112 pertains to the same resource 106A.

In this example, the recovery instruction 112 is associated with the first user account 116A, and the soft delete instruction 110 is associated with the second user account 116B. The soft delete instruction 110 is valid in that: (i) it has originated from a second user who successfully authenticated against the second user account 116B, and (ii) the second user account 116B is authorized to perform a soft delete action on the resource 106A. In the present example, the recovery instruction 112 is also valid in that: (i) it has originated from a first user who successfully authenticated against the first user account 116A, and (ii) the first user account 116A is authorized to perform a recovery action on the resource 106A.

In one example, upon successful completion of an authentication procedure against a given user account (e.g. verifying a user credential or credentials, such as a username and password, one time code, biometric etc.), the user authentication component 114 issues an authentication token associated with that account. A resource access instruction is received by the resource manager 102 with the authentication token, which the resource manager 102 verifies with the user authentication component 114 in determining whether the instruction is valid.

In the present example, the first user account 106A is different that the second user account 106B. That is, the soft delete instruction 110 and the recovery instruction 112 are associated with different user accounts. In a first example implementation, this does not prevent those instructions from being carried out (but does cause the detector 105 to perform a subsequent mitigation action). Thus, responsive to determining that the soft delete instruction 110 is valid in the above sense, the resource manager 102 carries out that instruction 110 by placing the resource 106A in a soft-deleted state (e.g. by marking it as soft deleted, or moving it to a special region of storage etc.). The resource manager 102 receives the recovery instruction 112 when the resource 106A is in the soft-deleted state. Responsive to determining that the recovery instruction 112 is valid in the above sense, the resource manager 102 carries out that instruction 112 by taking the resource 106A out of the soft-deleted state (e.g. by un-marking the resource, or moving out of the special region of storage etc.).

The resource manager records the soft delete instruction 110 and the recovery instruction 112 in the log database 108, by creating in the log database 108 a resource deletion log 108B responsive to the soft delete instruction 110, and a resource recovery log 108A responsive to the recovery instruction 112. The resource deletion log 108B includes a resource identifier of the resource 106A and an identifier of the second user account 116B, thus identifying the second user account 116B as a source of the soft delete instruction 110. The resource recovery log 108A includes a resource identifier of the resource 106A and an identifier of the first user account 116A, thus identifying the first user account 116A as a source of the recovery instruction 112. Although a single log database 108 is shown, in an alternative implementation, the logs 108B and 108A are stored in separate log databases.

The detector 104 has access to the log database 108 (or log databases), and can therefore access the deletion log 108B and the recovery log 108A. The detector 104 retrieves the recovery log 108A from the log database 108. For example, the detector 104 may regularly query the log database 108 for any recovery logs that have been created since a previous query event.

In retrieving the recovery log 108A, the detector 104 detects the recovery instruction 112. In this example, that detection is performed after the recovery instruction 112 has been received and carried out by the resource manager 102. Responsive to detecting the recovery instruction 112, the detector 104 matches the recovery instruction 112 to the corresponding soft-delete instruction 110. In this example, the detector 102 queries the log database 108 based on the resource identifier contained in the recovery log 108A, which the database 108 matches to the resource identifier in the deletion log 108B.

Having obtained the recovery log 108A and the corresponding deletion log 108B for the resource 106A, the detector 104 compares the user second account 116B associated with the deletion log 108B with the first user account 116A associated with the recovery log 108A, and thus determines a mismatch between those accounts 116A, 116B. The detector 102 may or may not access the user account database 116 to perform this comparison. For example, the detector 102 may compare the user identifiers contained in the logs 108A, 108B directly, and determine the mismatch based on that comparison, without needing to access the user account database 116. In response to determining the mismatch, the detector 104 performs a mitigation action, such as generating a security alert and/or reversing the recovery instruction 112 (e.g. by placing the resource 106A back into the soft-deleted state, or permanently deleting the resource 106A).

A recovery instruction originating from the same user account as a corresponding soft delete instruction does not result in a user account mismatch, and thus does trigger the aforementioned mitigation action.

In a second example implementation, the detector 104 is used to determine whether to accept or reject the recovery instruction 112. In such implementation, the mismatch between the first user account 116A and the second user account 116B results in the resource manager 102 rejecting the recovery instruction 112 altogether, meaning it is not carried out. In response to the resource manager 102 receiving the recovery instruction 112, the resource manager 102 causes the detector 104 to access the log database 108 to retrieve the corresponding deletion log 108B, and the detector 102 determines that the resource identifier associated with the recovery instruction 112 does not match the resource identifier in the corresponding deletion log 108B. In response, the detector 102 causes the resource manager 102 to reject the recovery instruction 112 (which another example of a possible mitigation action), meaning the recovery instruction 112 not carried out. Optionally, the detector 102 may also provide a security alert in this case. In this second implementation, the first user account 116A may have some level of authorization to carry out recovery actions (e.g. to recover resources which they soft-deleted themselves), but it not authorized to carry out a recovery action on the resource 106A that was soft-deleted by a different user.

In this second implementation, the recovery log 108A recording the recovery instruction 112 may still be created, but will indicate the attempted recovery of the resource 106A was unsuccessful. For example, the recovery log 108A can be useful in a subsequent analysis, e.g. to identify the first user account 116A as the source of the unsuccessful recovery attempt (indicating that it might have been compromised). In an alternative implementation, the unsuccessful recovery attempt is not logged.

Hence, depending on the implementation, the resource manager 102 may or may not communicate with the detector 104 in determining whether to accept a recovery instruction, as denoted by the dotted arrow between the detector 104 and the resource manager 102 in FIG. 1.

The resource manager 102, detector 104 and user authentication component 114 are functional components that may be implemented in software, hardware or any combination thereof. In a software implementation, the functionality of those component 102, 104, 114 is implemented by a computer responsive to computer executable instructions encoding that functionality.

Figure 2:
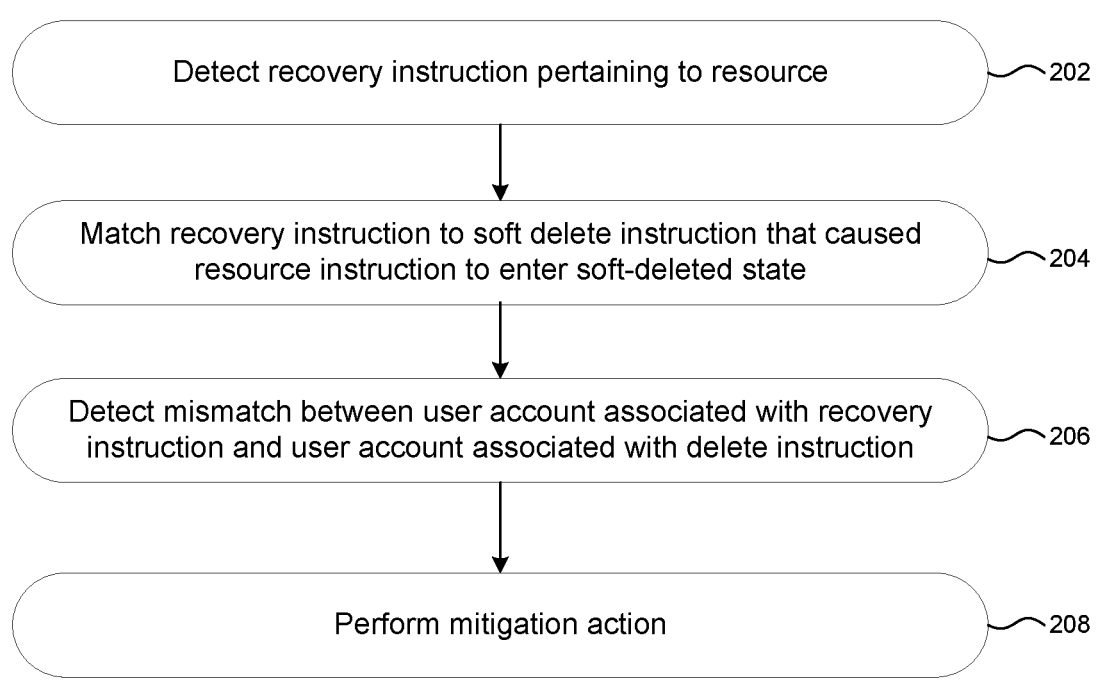
FIG. 2 shows a schematic flow chart for a method of detecting a potentially suspicious resource recovery attempt.

FIG. 2 shows a schematic flowchart for a method of detecting a suspicious recovery event. The method of FIG. 2 is computer-implemented, being carried out by a suitably configured computer system. The computer system may be so configured, for example, by programming one or more general-purpose processors (e.g. a CPU, GPU etc.) or logic (e.g. programmable circuitry (e.g., such as a Field Programmable Gate Array) to carry out the described operations, and/or through the use of dedicated hardware (such as an Application Specific Integrated Circuit). The term computer includes any programmable, non-programmable or partially-programmable hardware capable of performing computations.

At step 202, a recovery instruction is detected. It is assumed the resource was, at some point prior to this, in a soft-deleted state. The recovery instruction may pertain to a resource that is in a soft-deleted state when step 202 is performed (as in the second implementation described above). Alternatively, the resource may not be in a soft-deleted state when step 202 is performed, because the detection of step 202 may be performed after the recovery instruction has been carried out, and the resource has been successfully recovered from its earlier soft-deleted state (as in the first implementation described above).

At step 204, the recovery instruction as detected at step 202 is matched to a corresponding soft delete instruction that previously caused the resource to enter a soft-deleted state. The instructions are matched based on respective resource identifiers associated therewith.

At step 206, a mismatch is detected between a first user account associated with the recovery instruction and a second user account associated with the soft delete instruction. A user account is said to be associated with an access instruction (e.g. soft delete or recovery instruction) when the access instruction has been generated based on a successful authentication against that user account. However, this does not necessarily imply that the access instruction is authorized, because an attacker may have gained illegitimate access to the user account in question. A mismatch between the accounts suggests the user who recovered (or has attempted to recover) the resource is different than the user who instigated the soft deletion.

At step 208, an appropriate mitigation action is performed in response to detecting the mismatch between the user accounts, such as generating a security alert, rejecting the recovery instruction (if it has not yet been carried out at that point), or reversing the recovery instruction (if it has already been carried out).

Figure 3:
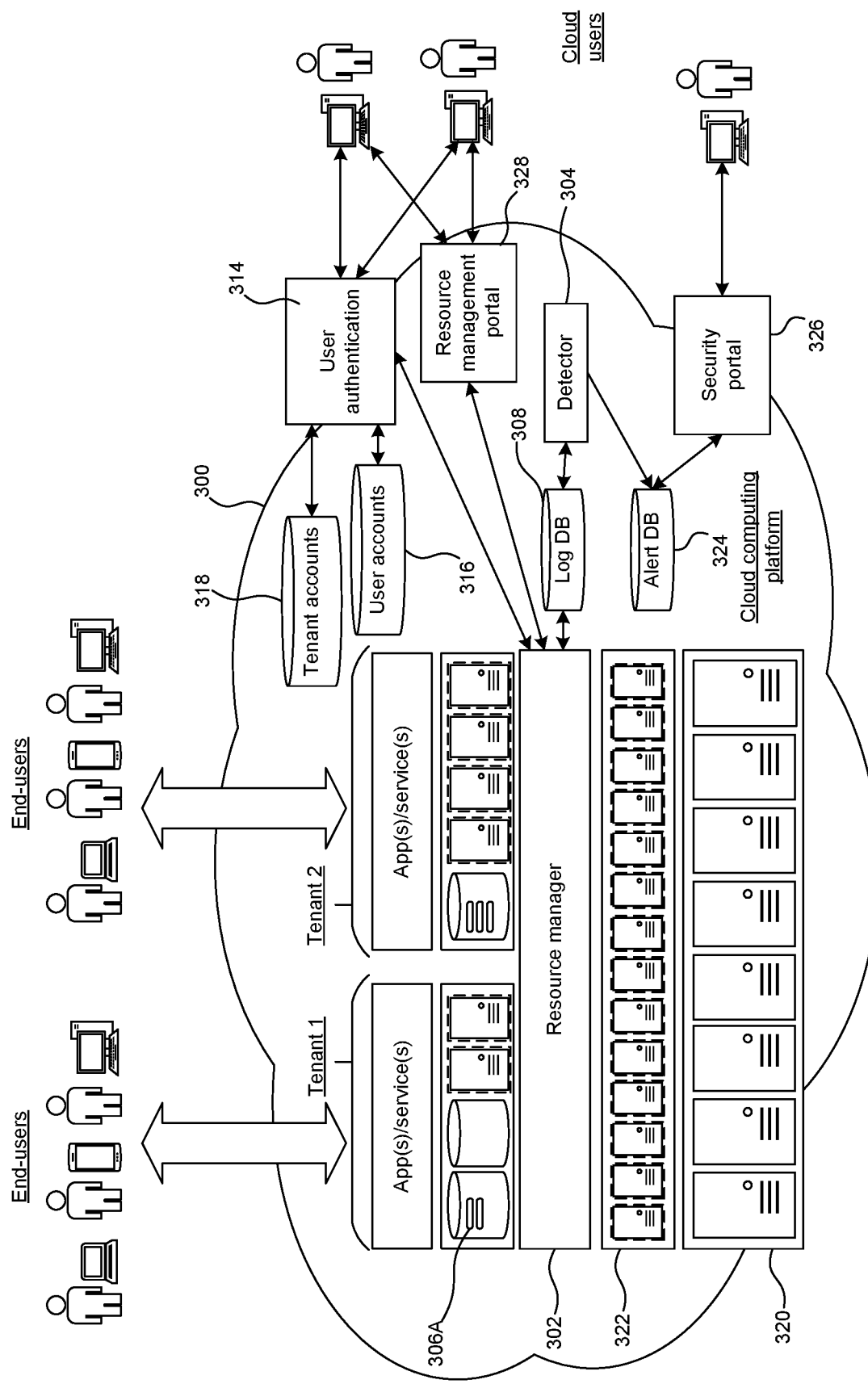
FIG. 3 shows a schematic block diagram of an example cloud computing system.

FIG. 3 shows a schematic block diagram of an example deployment context.

FIG. 3 shows a cloud computing system 300 comprising a resource manager 302, a detector 304 and user authentication component 314, corresponding to a possible implementation of the resource manager 102, detector 104 and user authentication component 114 of FIG. 1.

FIG. 3 depicts an example of a multi-tenant cloud platform (or part of the platform), comprising the cloud computing system 300, in which multiple tenant (e.g. organizations, application providers, service providers etc.) are supported by a set of physical cloud infrastructure 320, such as physical servers and data storage units. The physical cloud infrastructure 320 is configured to implement a set of virtual infrastructure 322, such as virtual machines (VMs), that can be allocated between tenants. The resource manager 302 is responsible for the allocate of virtual infrastructure, and the management of resources maintained within the virtual infrastructure 322 (stored, at the hardware level, within hardware storage of the physical infrastructure 320, but managed through virtualization). A user account database 316 records user accounts of cloud users, which is to say users that have some level of access and control of resources within the cloud. Although a single user account database 316 is depicted, in other implementations multiple user account databases may be provided (e.g. a separate user account database for each tenant). In this example, a tenant account database 318 records a 'master' account of each tenant, and each user account is associated with a specific tenant account. Tenant and user accounts could, alternatively, be stored in the same database (or databases) as each other.

A cloud user can access resources for which they have been granted access rights via a resource management portal 328. To access the resource management portal 328, a cloud user authenticates themselves to the authentication component 314 against one of the cloud user accounts. This typically involves the user providing a user credentials or credentials for the account in question that can be verified (such as a username, password, pass code, and/or biometric etc.). Once authenticated, the user can perform access operations, such as resource soft deletion and resource recovery, to the extent permitted by the access rights associated with the user account. Such actions are logged in a log database 308 in the manner described above. For example, FIG. 3 shows a resource 306A within a first tenant's virtual infrastructure, and a soft delete action and subsequent recovery action (e.g., a successful recovery or unsuccessful recovery attempt) may be logged in the log database 308. The detector 304 generates a security alert in an alert database 324 on detecting a suspicious recovery event. The security alert in the alert database 324 is accessible via a separate cybersecurity portal 326. In some cases, the cybersecurity portal 326 has more restricted access than the resource management portal 328 (e.g. limited to a particular tenant user or a particular subset of tenant users).

Within the cloud computing system 300, a resource identifier may, for example, take the form of a resource URI (Uniform Resource Indicator), or the combination of a resource URI and tenant identifier.

A user with access to the resource management portal 328 can view resources that are currently in a soft-deleted state, to the extent permitted by their access rights. Typically, only a single tenant's resources would be visible to any given user. In some cases, only a subset of those resources may be visible. The user can perform or attempt to perform a recovery action on a soft-deleted resource, but cannot see from the resource management portal 328 who it was that instigated the soft delete action originally.

Figure 4:
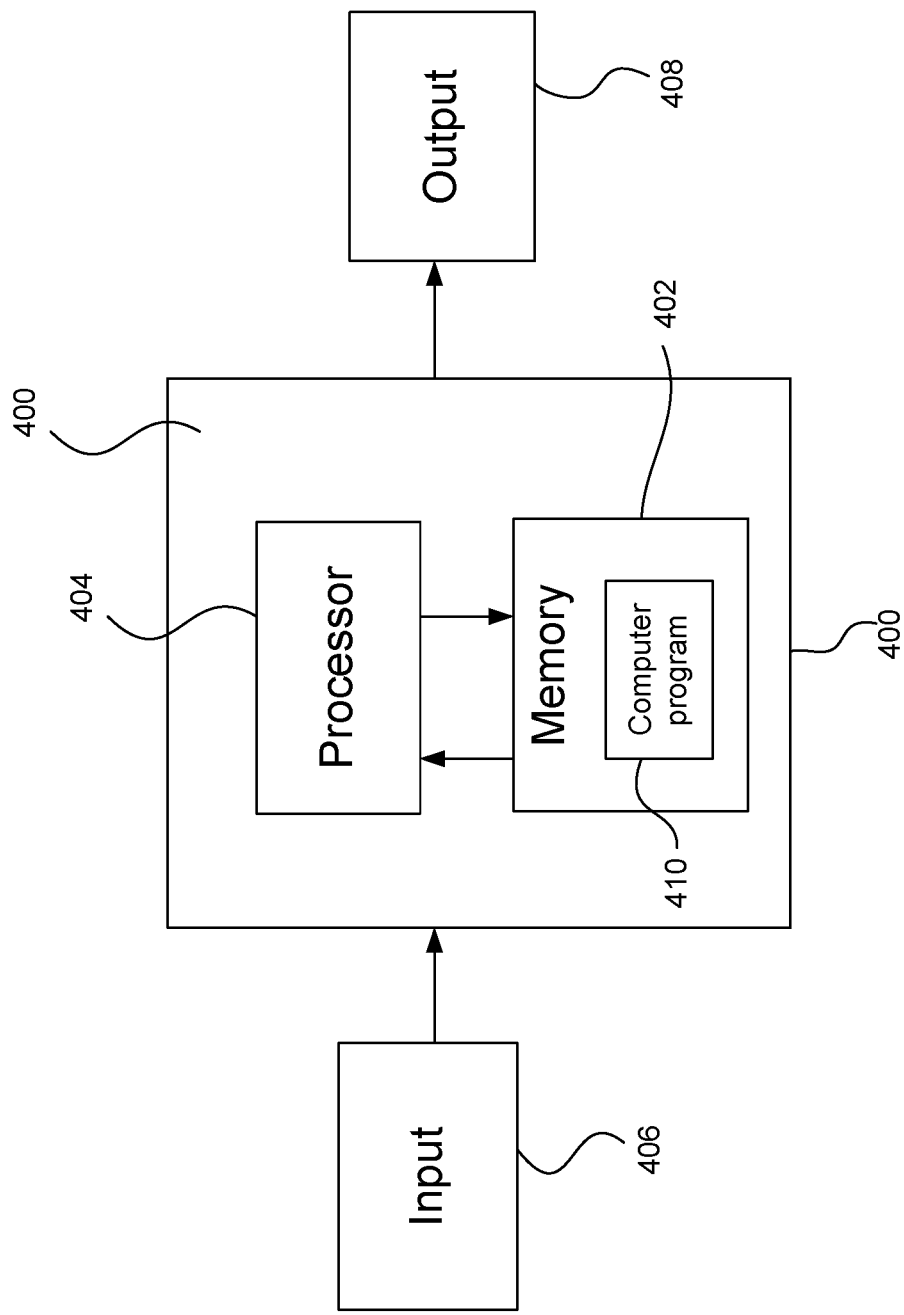
FIG. 4 shows a schematic block diagram of a computer system.

FIG. 4 is a schematic block diagram of an example computer system 400 on which the methods/functions describe above can be implemented. The computer system 400 comprises a memory 402 and a processor 404 coupled to the memory 402, such as a CPU. A computer program 410, comprising computer executable instructions, is stored in the memory 402 for execution on the processor 404. The computer system 400 may be configured, in executing the computer program 410, to implement the functional components of FIG. 1 or 3, or carry out the method of FIG. 2. An input 406 to the computer system may for example comprise a recovery instruction, or an indication of a recovery instruction. An output 408 may be outputted as part of a mitigation action, a could for example comprise a security alert. In some examples, computer executable instructions are provided using any computer-readable media that are accessible by the computing equipment. Computer-readable media include, for example, computer storage media such as memory and communications media. Computer storage media include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory) is shown within the computing equipment, it will be appreciated by a person skilled in the art, that, in some examples, the storage is distributed or located remotely and accessed via a network or other communication link (e.g., using a communication interface).

According to a first aspect herein, a computer system comprises a memory embodying computer-readable instructions; and a processor coupled to the memory and configured to execute the computer-readable instructions, the computer-readable instructions being configured to cause the processor to: detect a recovery instruction pertaining to a resource; match the recovery instruction with a soft delete instruction that caused the resource to enter a soft-deleted state; determine a mismatch between a first user account associated with the recovery instruction and a second user account associated with the soft delete instruction; and perform a mitigation action based on determining the mismatch between the first user account and the second user account.

In embodiments, the mitigation action may comprise causing a security alert to be generated.

The mitigation action may comprise one of: rejecting the recovery instruction, resulting in the resource remaining in the soft-deleted state, and reversing the recovery instruction, resulting in one of: the resource being deleted, and the resource re-entering the soft-deleted state.

The recovery instruction may be instigated via a resource management user interface accessed based on the first user account, and the resource management user interface may be configured to indicate the resource as marked for deletion without identifying the second user account as a source of the soft delete instruction.

The resource management interface may be a resource management graphical user interface (GUI).

The first user account and the second user account may be associated with a backend system, and the resource may be stored in a computer storage region within the backend system, and the first user account and the second user account may have access rights to the resource within the backend system.

The recovery action may be instigated via a resource management portal of the backend system that is accessed based on the first user account, and the resource management portal may be configured to indicate the resource as marked for deletion without identifying the second user account as a source of the soft delete instruction.

The backend system may be a cloud computing system.

Matching the recovery instruction with the soft delete instruction may comprise matching a first resource identifier associated with the recovery instruction with a second resource identifier associated with a resource deletion log recording the soft delete instruction.

The recovery instruction may be detected based on a resource recovery log that records the recovery instruction, and the first resource identifier may be associated with the resource recovery log.

According to a second aspect herein, a computer-implemented method comprises: detecting a recovery operation performed or attempted on a data item held in a storage resource; matching the recovery operation with a soft delete operation that caused the data item to enter a soft-deleted state; determining a discrepancy between a first user identifier associated with the recovery operation and a second user identifier associated with the soft delete operation; and performing a cybersecurity response responsive to determining the discrepancy between the first user identifier and the second user identifier.

The cybersecurity response may comprise causing a security alert to be generated.

The cybersecurity response may comprise one of: rejecting the recovery operation, resulting in the data item remaining in the soft-deleted state, and reversing the recovery operation, resulting in one of: the data item being deleted, and the data item re-entering the soft-deleted state.

The e recovery operation may be instigated via a user interface accessed based on the first user identifier, and the user interface may be configured to indicate the data item as marked for deletion but may not identify any association between the second user identifier and the soft delete operation.

The user interface may comprise a graphical user interface (GUI).

The first user identifier and the second user identifier may be associated with a storage system, the data item may be stored in a computer storage location within the storage system, and the first user identifier and the second user identifier may be associated with respective access rights to the data item within the storage system.

The recovery operation may be instigated via a management portal of the storage system that is accessed based on the first user identifier, and the management portal may be configured to indicate the data item as marked for deletion but may not identify any association between the second user identifier and the soft delete operation.

The storage system may form part of a cloud computing platform.

Matching the recovery operation with the soft delete operation may comprise matching a first data item identifier associated with the recovery operation with a second data item identifier associated with a deletion log recording the soft delete operation.

A third aspect herein provides a computer storage medium containing computer executable instruction that are configured, upon execution by a processor, to cause the processor to implement operations of: detecting a recovery instruction pertaining to a resource; matching the recovery instruction with a soft delete instruction that caused the resource to enter a soft-deleted state; determining a discrepancy between a first user identifier associated with the recovery instruction and a second user identifier associated with the soft delete instruction; and performing a cybersecurity response responsive to determining the discrepancy between the first user identifier and the second user identifier.

Whilst various embodiments are described above, it will be appreciated these are illustrative and not exhaustive. The scope of the present disclosure is not defined by the described embodiments, but only by the accompanying claims

The invention claimed is:

1. A computer system comprising:
   a memory embodying computer-readable instructions; and
   a processor coupled to the memory and configured to execute the computer-readable instructions, the computer-readable instructions being configured to cause the processor to:
   detect a recovery instruction pertaining to a resource, wherein the recovery instruction is associated with a first user account comprising a first user account identifier and a first user account credential;
   match the recovery instruction with a soft delete instruction that caused the resource to enter a soft-deleted state, wherein the soft delete instruction is associated with a second user account comprising a second user account identifier and a second user account credential, wherein the second user account is authorized to soft delete the resource;
   determine a mismatch between the first user account associated with the recovery instruction and the second user account associated with the soft delete instruction; and
   perform a mitigation action based on determining the mismatch between the first user account and the second user account.

2. The computer system of claim 1, wherein the first user account has access rights to view that the resource is in the soft-deleted state but does not identify the second user account as a source of the soft delete instruction.

3. The computer system of claim 2, wherein the mitigation action comprises one of:
   rejecting the recovery instruction, resulting in the resource remaining in the soft-deleted state, and
   reversing the recovery instruction, resulting in one of: the resource being deleted, and the resource re-entering the soft-deleted state.

4. The computer system of claim 1, wherein the recovery instruction is instigated via a resource management user interface accessed based on a user providing the first user account credential, wherein the resource management user interface is configured to indicate the resource as marked for deletion but does not identify the second user account as a source of the soft delete instruction.

5. The computer system of claim 4, wherein the mitigation action comprises causing a security alert to be generated, wherein the security alert is accessible via a cybersecurity user interface separate from the resource management user interface.

6. The computer system of claim 1, wherein the first user account and the second user account are associated with a backend system, and the resource is stored in a computer storage region within the backend system, wherein the first user account and the second user account have access rights to the resource within the backend system based upon providing the first user account credential and the second user account credential, respectively.

7. The computer system of claim 6, wherein the recovery instruction is instigated via a resource management portal of the backend system that is accessed based on a user providing the first user account credential, wherein the resource management portal is configured to indicate the resource as marked for deletion but does not identify the second user account as a source of the soft delete instruction.

8. The computer system of claim 1, wherein the computer-readable instructions are further configured to cause the processor to:
   generate a resource recovery log that records the recovery instruction, wherein the resource recovery log comprises a first resource identifier of the resource and the first user account identifier.

9. The computer system of claim 8, wherein matching the recovery instruction with the soft delete instruction comprises matching the first resource identifier associated with the recovery instruction with a second resource identifier included in a resource deletion log recording the soft delete instruction, wherein the resource deletion log comprises the second user account identifier.

10. The computer system of claim 9, wherein the resource deletion log is not accessible by the first user account, and wherein the resource recovery log is configured to indicate if the recovery instruction was unsuccessful.

11. A computer-implemented method comprising:
    detecting a recovery operation performed or attempted on a data item held in a storage resource, wherein the recovery operation is associated with a first user account comprising a first user account identifier and a first user account credential;
    matching the recovery operation with a soft delete operation that caused the data item to enter a soft-deleted state, wherein the soft delete operation is associated with a second user account comprising a second user account identifier and a second user account credential, wherein the second user account is authorized to soft delete the data item;
    determining a discrepancy between the first user account identifier associated with the recovery operation and the second user account identifier associated with the soft delete operation; and
    performing a cybersecurity response responsive to determining the discrepancy between the first user account identifier and the second user account identifier.

12. The method of claim 11, wherein the first user account has access rights to view that the data item is in the soft-deleted state but does not identify the second user account as a source of the soft delete operation.

13. The method of claim 12, wherein the cybersecurity response comprises one of:
    rejecting the recovery operation, resulting in the data item remaining in the soft-deleted state, and
    reversing the recovery operation, resulting in one of: the data item being deleted, and the data item re-entering the soft-deleted state.

14. The method of claim 11, wherein the recovery operation is instigated via a user interface accessed based on a user providing the first user account credential, and wherein the user interface is configured to indicate the data item as marked for deletion but does not identify any association between the second user account identifier and the soft delete operation.

15. The method of claim 14, wherein the cybersecurity response comprises causing a security alert to be generated, wherein the security alert is accessible via a cybersecurity user interface separate from the user interface.

16. The method of claim 11, wherein the first user account identifier and the second user account identifier are associated with a storage system, and the data item is stored in a computer storage location within the storage system, wherein the first user account identifier and the second user account identifier are associated with respective access rights to the data item within the storage system based upon providing the first user account credential and the second user account credential, respectively.

17. The method of claim 16, wherein the recovery operation is instigated via a management portal of the storage system that is accessed based on a user providing the first user account credential, wherein the management portal is configured to indicate the data item as marked for deletion but does not identify any association between the second user account identifier and the soft delete operation.

18. The method of claim 11, further comprising:
generating a recovery log that records the recovery operation, wherein the recovery log comprises a first data item identifier of the data item and the first user account identifier, wherein the first data item identifier is associated with the recovery operation.

19. The method of claim 18, wherein matching the recovery operation with the soft delete operation comprises matching the first data item identifier associated with the recovery operation with a second data item identifier included in a deletion log recording the soft delete operation, wherein the deletion log comprises the second user account identifier.

20. A computer storage medium containing computer executable instruction that are configured, upon execution by a processor, to cause the processor to implement operations of:
detecting a recovery instruction pertaining to a resource, wherein the recovery instruction is associated with a first user account comprising a first user account identifier and a first user account credential;
matching the recovery instruction with a soft delete instruction that caused the resource to enter a soft-deleted state, wherein the soft delete instruction is associated with a second user account comprising a second user account identifier and a second user account credential, wherein the second user account is authorized to soft delete the resource;
determining a discrepancy between the first user account identifier associated with the recovery instruction and the second user account identifier associated with the soft delete instruction; and
performing a cybersecurity response responsive to determining the discrepancy between the first user account identifier and the second user account identifier.

* * * * *